US012478102B2

(12) United States Patent
Kozlowski et al.

(10) Patent No.: US 12,478,102 B2
(45) Date of Patent: Nov. 25, 2025

(54) ELECTRONIC DEVICE FOR GENERATING AEROSOL, AND A METHOD OF GENERATING AEROSOL

(71) Applicant: ESMOKING INSTITUTE SP. Z O.O., Poznan (PL)

(72) Inventors: Marcin Kozlowski, Borek Wielkopolski (PL); Adrian Jakobczyk, Pila (PL); Pawel Zielazek, Poznan (PL); Michal Kozlowski, Borek Wielkopolski (PL)

(73) Assignee: ESMOKING INSTITUTE SP. Z.O.O., Poznan (PL)

( * ) Notice: Subject to any disclaimer, the term of this patent is extended or adjusted under 35 U.S.C. 154(b) by 0 days.

(21) Appl. No.: 18/433,284

(22) Filed: Feb. 5, 2024

(65) Prior Publication Data

US 2024/0381935 A1 Nov. 21, 2024

Related U.S. Application Data

(63) Continuation of application No. 15/547,934, filed as application No. PCT/EP2016/052397 on Feb. 4, 2016, now Pat. No. 11,910,830.

(30) Foreign Application Priority Data

Feb. 6, 2015 (PL) ........................................ 411136

(51) Int. Cl.
*A24F 40/46* (2020.01)
*H05B 3/26* (2006.01)
(Continued)

(52) U.S. Cl.
CPC ............. *A24F 40/46* (2020.01); *H05B 3/265* (2013.01); *H05B 3/46* (2013.01); *A24F 40/10* (2020.01)

(58) Field of Classification Search
CPC . H05B 3/06; H05B 3/12; H05B 3/265; H05B 3/46; A24F 40/10; A24F 40/20;
(Continued)

(56) References Cited

U.S. PATENT DOCUMENTS 5,408,574 A 4/1995 Deevi et al.
5,878,752 A * 3/1999 Adams .................. A24F 40/465
131/194
(Continued)

FOREIGN PATENT DOCUMENTS

CN 202407082 U 9/2012
CN 103750569 A 4/2014
(Continued)

OTHER PUBLICATIONS

"Decision to Grant received for Russian Patent Application No. 2017126471, mailed on Jun. 18, 2018", 10 Pages.
(Continued)

*Primary Examiner* — Hung D Nguyen
(74) *Attorney, Agent, or Firm* — MERCHANT & GOULD P.C.

(57) ABSTRACT

An electronic device for generating an aerosol used for administration to human respiratory tract as the aerosol, nicotine in particular, including a power unit and an evaporator unit, wherein the evaporator unit includes a heating system with a heating element and a fluid transporting element, wherein the heating element comprises a dielectric substrate with at least one resistive layer area applied thereon.

19 Claims, 4 Drawing Sheets

(51) Int. Cl.
*H05B 3/46* (2006.01)
*A24F 40/10* (2020.01)

(58) Field of Classification Search
CPC .......... A24F 40/30; A24F 40/42; A24F 40/46; A24F 40/48; A24F 40/485; A24F 40/50; A24F 40/51; A24F 40/57; A24F 40/60
See application file for complete search history.

(56) References Cited

U.S. PATENT DOCUMENTS

| | | | | |
|---|---|---|---|---|
| 8,881,737 | B2 | 11/2014 | Collett et al. | |
| 8,910,640 | B2 | 12/2014 | Sears et al. | |
| 9,980,518 | B1 | 5/2018 | Most et al. | |
| 10,172,387 | B2 | 1/2019 | Davis et al. | |
| 2011/0126848 | A1 | 6/2011 | Zuber et al. | |
| 2011/0226236 | A1 | 9/2011 | Buchberger | |
| 2012/0204889 | A1 | 8/2012 | Xiu | |
| 2013/0192620 | A1 | 8/2013 | Tucker et al. | |
| 2013/0340750 | A1* | 12/2013 | Thorens | A24F 40/50 128/202.21 |
| 2014/0150785 | A1 | 6/2014 | Malik et al. | |
| 2014/0305449 | A1 | 10/2014 | Plojoux et al. | |
| 2015/0047658 | A1 | 2/2015 | Cyphert et al. | |
| 2015/0181936 | A1* | 7/2015 | Lyubomirskiy | H05B 3/42 219/553 |
| 2016/0022930 | A1* | 1/2016 | Greim | A24F 40/30 131/328 |
| 2016/0120225 | A1* | 5/2016 | Mishra | A24F 40/20 392/386 |

FOREIGN PATENT DOCUMENTS

| | | | |
|---|---|---|---|
| CN | 103859604 | A | 6/2014 |
| CN | 203633510 | U | 6/2014 |
| CN | 203841119 | U | 9/2014 |
| CN | 203986095 | U | 12/2014 |
| CN | 204070532 | U | 1/2015 |
| EA | 019736 | B1 | 5/2014 |
| EP | 2609821 | A1 | 7/2013 |
| EP | 2787846 | A1 | 10/2014 |
| EP | 2493342 | B1 | 12/2014 |
| KR | 20130029697 | A * | 3/2013 |
| RU | 1565338 | A1 | 2/1996 |
| RU | 2378803 | C2 | 1/2010 |
| RU | 107026 | U1 | 8/2011 |
| RU | 115629 | U1 | 5/2012 |
| RU | 122000 | U1 | 11/2012 |
| RU | 2489948 | C2 | 8/2013 |
| WO | 2014054035 | A1 | 4/2014 |
| WO | 2014147114 | A1 | 9/2014 |
| WO | 2015102092 | A1 | 7/2015 |

OTHER PUBLICATIONS

"Decision to Grant received for Russian Patent Application No. 2018122904, mailed on Jun. 7, 2019", 7 Pages.
"Extended Search Report received for European Patent Application No. 20153340.3, mailed on May 7, 2020", 12 Pages.
"International Preliminary Report on Patentability received for PCT Patent Application No. PCT/EP2016/052397, mailed on Jan. 25, 2017", 6 Pages.
"International Search Report and Written Opinion received for PCT Patent Application No. PCT/EP2016/052397, mailed on May 19, 2016", 3 Pages.
"Office Action and search report received for Russian Patent Application No. 2019123313, mailed on Nov. 19, 2021", 8 Pages (Official Copy Only).
"Office Action received for Chinese Patent Application No. 20168008943.6, mailed on Sep. 3, 2019", 9 Pages (Official Copy Only).
"Office Action received for Korean Patent Application No. 10-2017-7021951, mailed on Aug. 13, 2018", 14 Pages (Official Copy Only).
"Search Report received for Poland Patent Application No. P.411136, mailed on Jun. 30, 2015", 2 Pages (Official copy Only).
JP Office Action in Japanese Application No. 2017-559908, dated Oct. 2, 2018, 5 pages.

* cited by examiner

ELECTRONIC DEVICE FOR GENERATING AEROSOL, AND A METHOD OF GENERATING AEROSOL

CROSS-REFERENCE TO RELATED APPLICATIONS

The present application is a continuation application of U.S. patent application Ser. No. 15/547,934 filed Aug. 1, 2017, which is a National Phase entry of PCT Application No. PCT/EP2016/052397, filed Feb. 4, 2016, which claims priority from PL Patent Application No. P.411136, filed Feb. 6, 2015, each of which is hereby fully incorporated herein by reference.

DESCRIPTION

The present disclosure relates to an electronic device for generating an aerosol, and an electronic cigarette in particular, comprising a power unit and an evaporator unit with a heating system. A device for generating an aerosol according to the disclosure is used for administration of substances in a form of aerosol to the human respiratory tract, nicotine in particular.

BACKGROUND

The phenomenon of smoking is known in the world for hundreds of years and more recently the electric atomization cigarette was invented. By eliminating the combustion method, it is an alternative to a traditional cigarette. Moreover, thanks to the similarity in the way of application and similarity in external appearance to a traditional cigarette it can help replace smoking. Instead of tobacco in a solid form, nicotine liquid is most commonly used in the electronic cigarette, for example based on glycol and glycerol. Nicotine liquid is heated, thereby forming an aerosol which is subsequently inhaled by the smoker. Electronic cigarettes typically consist of at least three basic elements. The first element is a power source storing energy in any form, typically electricity. This may for example be a cylindrical battery that allows charge and re-use of the apparatus. The second element is an electronic board for controlling the functionality of the device. The third element is the heating system (otherwise evaporator or atomizer). This system consists of a reservoir for storing nicotine liquid, and the heating system responsible for heating the material to a temperature of evaporation.

For example from US 2012/204889 an electronic device for generating an aerosol in the form of the electronic cigarette of the evaporator is known, wherein the heating system comprises a heating element in the form of a resistance wire wound on the fluid transporting element in the form of a wick.

A disadvantage of this known electronic cigarette is that the time of its production is increased due to the difficulty of mounting a heating element in the form of a resistance wire. As a result, it increases the unit cost of production of this type of cigarette. Additionally a heater from a resistive wire frequently fails because the carbon deposits formed on the heating element of the smoked nicotine liquid prevent giving off heat by the heater, which in turn reduces the efficiency of evaporation, and eventually its burnout. It is possible to clean the heater, e.g. under running water, but the method is very inconvenient from the point of view of the user of the electronic cigarette.

These problems have been partly solved in CN 203633510. This document discloses an electronic device for generating an aerosol in the form of the electronic cigarette with a heating system (evaporator) containing a heater resistor in the form of metallic, preferably stainless steel. Nicotine fluid is supplied to the surface of the resistor element by using capillary force, wherein this element extends through a resistor. In addition, the above metal resistor may be a hollow ceramic member with a through hole through which the nicotine fluid transporting element passes.

However, a disadvantage of this solution is that the heating element in the form of metallic resistor is an expensive component, increasing the cost of manufacture of the cigarette. Moreover, it is not dedicated to the conversion of electrical energy into heat. Its specific structure (helical metal layer) also makes it difficult to lead a nicotine liquid transporting element through it.

An electronic device for generating an aerosol is also known from CN203841119 which is in the form of the electronic cigarette with the evaporator unit comprising a heating element in the form of a plate with a MMH heating resistor formed in thick-film technology on a stainless steel and a cylindrical nicotine fluid transporting element due to capillary force. This design also overcomes the disadvantages of the electronic cigarette with a heating element in the form of resistance wire, but due to the fact that the heating element is a MMH heating resistor, this type of electronic cigarette is expensive to produce. The high costs of a heater resistor MMH are due to the fact that the production of a metal substrate is used, inter alia, stainless steel. This material is very difficult in processing, and its use in the production of small components, with a different shape than the plate in particular, for example to the tubular elements, is very expensive, or impossible in the case of small diameters. In addition, the production of MMH resistor is quite complicated, because the substrate must be isolated from the resistive layer, and therefore require an additional manufacturing method, which will increase the final cost of the heating system. In addition, production costs of MMH resistor for applications in the electronic cigarette are rising due to the need to check the accuracy of the application of an insulating layer. The occurrence of inaccuracies in the application of an insulating layer can lead to short circuits, which could eventually lead to the failure of the control system or failure of the power source of the electronic cigarette.

SUMMARY OF THE INVENTION

The present disclosure provides therefore an electronic device for generating an aerosol in the form of the electronic cigarette, which can help address disadvantages associated with the use of resistance wire, and in addition can help ensure higher efficiency of the evaporation method and can be easier and cheaper to produce than other alternatives without a resistance wire.

An aspect of the disclosure is that an electronic device for generating an aerosol comprises a power unit and evaporator unit, the evaporator unit comprises a heating system with a heating element and a fluid transporting element, wherein the heating element consists of a dielectric substrate with at least one resistive layer area applied thereon.

In an embodiment, the device substrate of the heating element is made of ceramic.

In an embodiment, the device substrate of the heating element has a substantially cylindrical shape.

In an embodiment, the device substrate of the heating element is substantially plate-shaped.

In an embodiment, the device substrate of the heating element has a substantially prismatic shape.

In an embodiment in the device the fluid transporting element is threaded through the heating element.

In an embodiment in the device the fluid transporting element surrounds the heating element.

In an embodiment in the device the fluid transporting element is only in contact with the base.

The disclosure also relates to a method for generating an aerosol comprising feeding a fluid through a fluid transporting element to the heating element in an electronic device for generating an aerosol, wherein the fluid is heated by a heating element comprising a dielectric substrate with at least one resistive layer area applied thereon, to a suitable temperature so that the fluid fed to the heating element passed into gaseous state in contact with its surface.

An advantage of the structure of the heating element of the electronic cigarette of the present disclosure is primarily the facilitated maintenance (cleaning) of the heating element and its replacement due to easily removable nicotine fluid transporting element from the heating element. In addition, the electronic cigarette of the invention can be easier and cheaper to manufacture, thanks to using a heating element formed in thick-film technology on ceramic substrate which helps eliminate the electrical connections which are difficult to produce while necessary for some heating elements. The cost of the electronic cigarette of the present disclosure can therefore lower, due to the fact that small ceramic members forming the substrate of the heating element can be produced by means of casting methods rather than machining as in the case of stainless steel (or other metal).

Furthermore, the heating element made with a thick film can be more resistant to formation of carbon deposits, which can considerably increase the time of its lifespan as compared to conventional a heater made of a resistance wire.

BRIEF DESCRIPTION OF THE DRAWINGS

The electronic cigarette according to the invention is shown in the embodiment with reference to the accompanying drawings, in which.

DETAILED DESCRIPTION OF THE EMBODIMENT

One electronic cigarette according to the disclosure has a modular structure. Two basic units of the electronic cigarette are: a power unit 1 and an evaporator unit 2.

Figure 1:
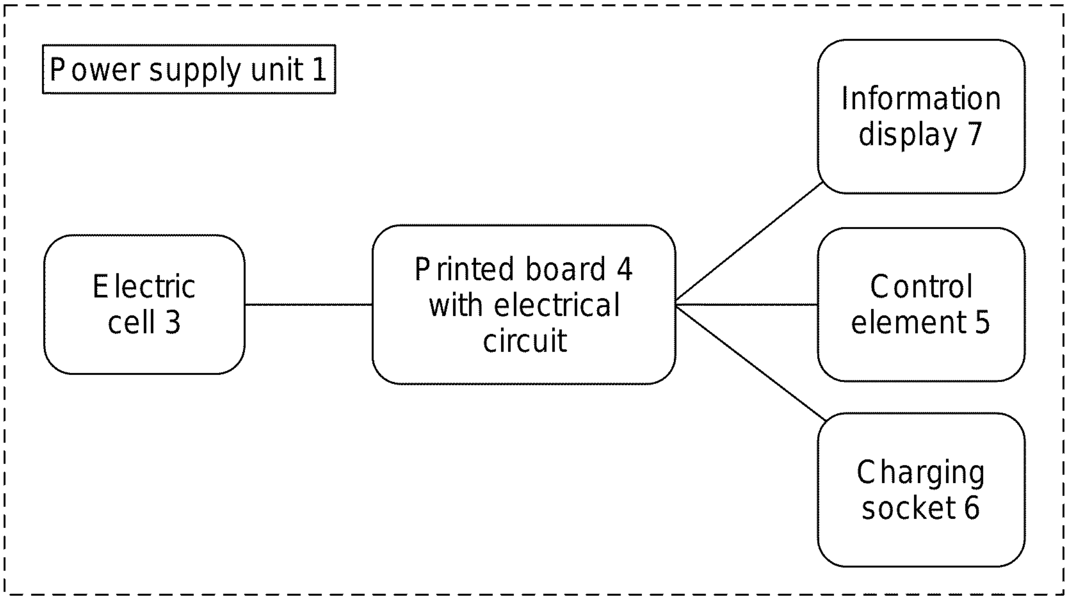
FIG. 1 shows a schematic diagram of the power unit of the electronic cigarette of the present disclosure.

As shown in FIG. 1, the power unit 1 comprises electric cell 3, the circuit board 4 with an electrical circuit, the control element 5 controlling an operation of the electronic cigarette, charging socket 6 of the electric cell 3 and the information display 7. The power unit 1 is arranged in the housing 8 (shown further in FIG. 6) aimed at protecting mechanical power unit 1 and provides adequate visual and aesthetic qualities.

Activating the electronic cigarette occurs when a smoker activates the control element 5, which is placed on the housing 8 of the power unit 1. This causes the activation of the control system located on the circuit board 4 with an electric circuit. The purpose of the control is to provide an electrical voltage the source of which is an electric cell 3, to the heating element 11 located in the evaporator unit 2.

Figure 2:
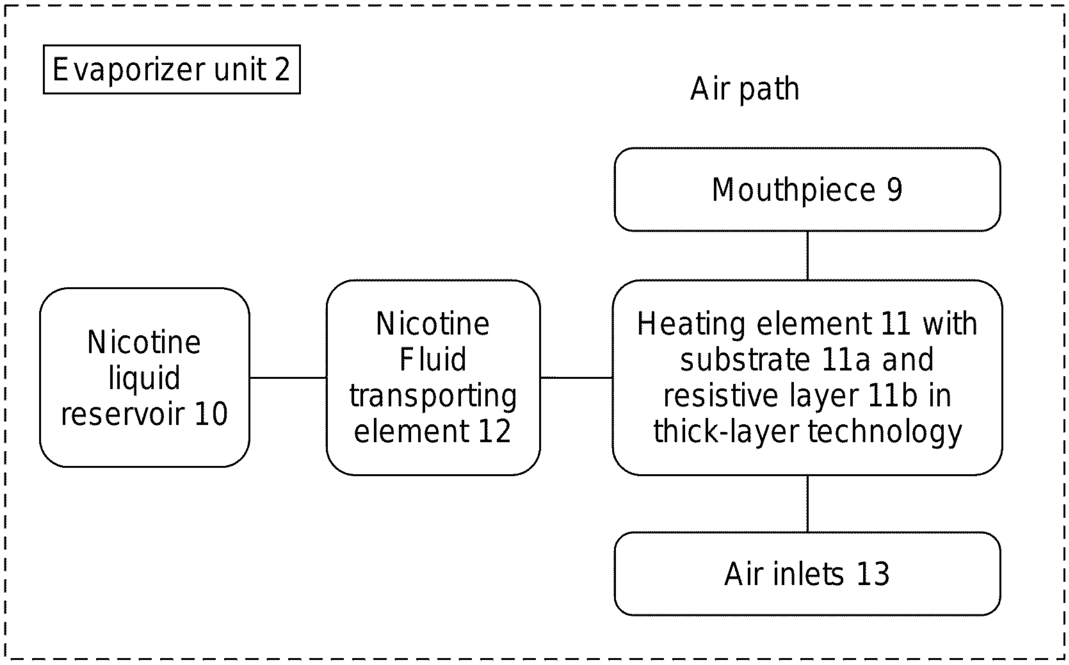
FIG. 2 shows a schematic diagram of the evaporator unit of the electronic cigarette of the present disclosure.

As shown in FIG. 2, the evaporator unit 2 has a mouthpiece 9, the nicotine liquid reservoir 10, the heating element 11, the nicotine fluid transporting element 12 and inlets 13 disposed in the outer walls of the housing of the evaporator 14, the above-mentioned elements of the evaporator unit 2 are combined in a series so as to form the air path. The evaporator unit 2 is placed in a housing 14 whose function is to mechanically protect the evaporator unit 2, to provide the tightness of the entire system and preventing leakage of nicotine liquid to the environment. The evaporator housing 14 can be made of a transparent material or be provided with a window 15 of a material to visualize the fluid level of nicotine in the reservoir 10. Moreover, the housing 14 of the evaporator unit 2 provides the appropriate visual and aesthetic qualities of the entire unit.

The evaporator unit 2 is a unit into which a nicotine liquid is poured. The heating element 11 inside the evaporator unit 2 applies heat and converts a nicotine liquid into aerosol, which the user then inhales through the electronic cigarette. The nicotine liquid is delivered directly to the heater 11 by the nicotine fluid transporting element 12. The fluid transporting element 12 has contact with the fluid reservoir 10 on one side. The nicotine liquid reservoir 10 can be made as a single use or a rechargeable refillable use element. One skilled in the art will appreciate that the evaporator unit 2 and the power supply 1 may be also provided with other components than those exemplified or may not have some of these components.

FIGS. 3-5 and 7-8 show embodiments of a heating element 11 according to the disclosure. In general, the heating element 11 comprises a substrate 11*a* having the form of a plate or a cylindrical element of a material which is not electrically conductive with the applied resistive layer 11*b*, serving as the heater. One skilled in the art will appreciate that a substrate of dielectric material may be of any shape other than the substantially plate-shaped or cylindrical, for example, substantially prismatic. One skilled in the art will appreciate that the term "substantially" also includes such substrates shapes which are similar to the shape of specified known definition. A resistive layer 11*b* is applied on the substrate 11*a* by a thick-film technique. Nicotine liquid is delivered to the surface of the heating element 11 by means of the nicotine fluid transporting element 12 which advantageously may contact only with the surface 11*a*. The purpose of the heater is to convert the supplied electric energy into thermal energy (heat). The conversion of electric energy into heat is possible by the flow of electrical current through resistive layer 11*b* deposited on the substrate 11, for example ceramic, by a thick-film technique. As a result of the flow of electrical current through resistive layer 11*b*, the ceramic substrate 11 is heated to a high temperature. A contact of nicotine liquid with the heated surface 11*a* of the substrate results in the conversion of nicotine liquid into aerosol.

The aerosol in a gaseous state, generated as a consequence of evaporation of nicotine liquid is in the "air path" area that connects a mouthpiece 9 placed on top of the electronic cigarette with the air inlets 13 located at the bottom thereof. Once a smoker performs an action of taking a puff of air through the mouthpiece 9 the aerosol resulting from evaporation of the nicotine liquid enters the lungs.

Information display 7 arranged at the power unit 1 is controlled by the electronic circuit disposed on a circuit board 4, and can display the current state of the voltage level of the electric cell 3, the number of puffs taken on a given day, etc.

An additional function of the electronic systems disposed on a circuit board 4 in the power unit 1 is to limit the operating time of the heating element 11 during a single use, the detection of a short circuit at the terminals of the external power supply unit 1, control of charging of electric cell 3 from the external electric power source and forming the shape and amplitude of the voltage applied to the element heater 11, depending on the level of voltage of the electric cell 3 so as to obtain optimal and uniform experience when using the electronic cigarette.

Figure 3:
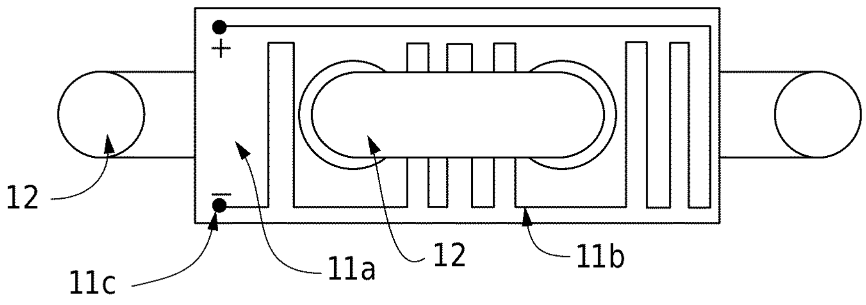
FIG. 3 shows a top view of the heating element of the fluid transporting element according to the first embodiment of the lamellar dielectric substrate.

FIG. 3 shows a first embodiment of a heating element 11 according to the disclosure. The heating element 11 has a form of a plate consisting of a dielectric substrate 11 with the applied resistive layer 11*b* in the thick film technology, through which the nicotine fluid transporting element is threaded. The substrate 11*a* is made of a dielectric material, e.g. ceramics. The advantage of this type of material is that for the production of these small elements the foundry methods are used and not the machining methods, such as e.g. in the case of stainless steel.

A resistive layer 11*b* is made of an electrically conductive material, with resistive properties, which converts electrical energy into heat during the flow of electric current through the element. A resistive layer may be continuous or form various patterns like straight lines (of different widths) to more complex combinations (see FIG. 3). The resistance value of the resistive layer depends on the used material to its implementation. The resistive layer can be applied both on the internal and the external side of the substrate. Moreover, there may be several area of separate resistive layer 11*b* on one substrate 11, which will form separate heaters.

As indicated above, a capillary effect is used in the evaporator unit 1, which causes the nicotine liquid to be transferred through the fluid transporting element 12 directly on the hot surface of the heating element 11, thereby causing the generation of aerosol. The ends of the fluid transporting element 12 are in the reservoir 10, and are in direct contact with the nicotine liquid.

The fluid transporting element 12 due to the capillary effect becomes saturated over the entire length and thereby transports the nicotine liquid to the surface of the heating element 11, which is separated from the reservoir 10, for example by means of seals. An application of the nicotine fluid transporting element 12 while separating the heating element 11 from the fluid in the reservoir 10 allows for delivery of a suitable amount of fluid at a time. The amount of fluid will be greater the greater the contact area of the nicotine fluid transporting element 12 with the surface of the heating element 11. Evaporation of nicotine liquid may be on the substrate surface 11*a*, or on the surface of the resistive layer 11*b*, wherein the preferred one is where the fluid contacts a substrate layer because the chemical reactions taking place there.

Figure 4:
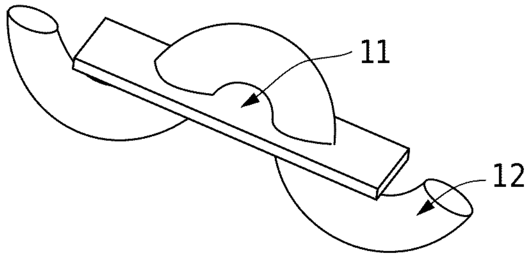
FIG. 4 shows a perspective view of a heating element of the fluid transporting element according to the first embodiment.
Figure 5:
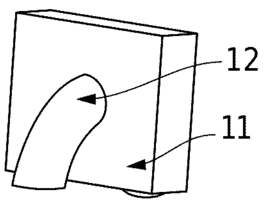
FIG. 5 shows a perspective view of a heating element of the fluid transporting element according to another embodiment.
Figure 7:
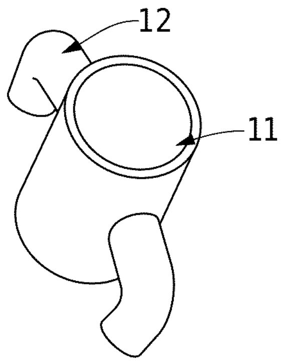
FIG. 7 shows a first embodiment of the cylindrical heating element with a fluid transporting element of the second embodiment.
Figure 8:
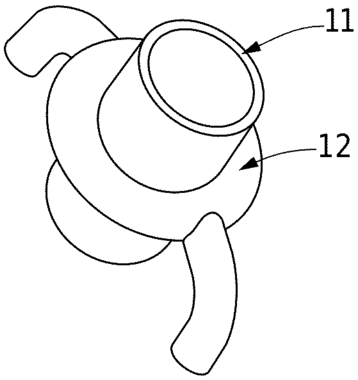
FIG. 8 shows another variation of the cylindrical heating element with a fluid transporting element of the second embodiment.

The nicotine fluid transporting element 12 in the electronic cigarette may be a string ceramic, mesh, cotton, or other well-fluids transporting element. The fluid transporting element 12 may be wound on the heating element 11 (see FIG. 8) or pass through it (see FIGS. 3, 4, 5, and 7). As shown in FIGS. 4, 5, 7, the number of passes through the heating element 11 may be 1, 2 or more. An example of string ceramics can be found e.g. at www.hangsenshop.eu. In FIGS. 4, 5 and 7, 8 a resistive layer 11*b* is not shown for the sake of clarity, but one skilled in the art will appreciate that it may take various shapes and may be disposed on an inner or outer layer of the substrate.

Figure 6:
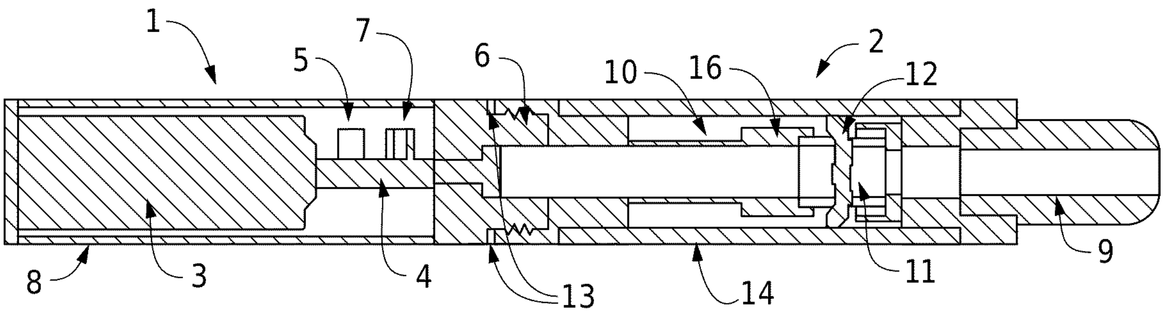
FIG. 6 shows a longitudinal sectional view of the electronic cigarette according to a first embodiment of the lamellar heating element.

FIG. 6 shows a longitudinal sectional view of the electronic cigarette with the heater element 11 made as a resistive layer 11*b* applied on the ceramic substrate 11*a* according to the first embodiment, i.e. with the heating element 11 in the form of a plate. The main benefits of this approach include the elimination of the construction of the evaporator unit electric cables used to connect the heating element 11 with the power source 3. The connection of the heating element 11 to the power supply 3 is realized by applying a resistive layer 11*b* on the ceramic substrate 11, which has outputs in the form of the power points 11*c* applied on the substrate 11*a*, to which the power supply is connected. Power points 11*c* are fixed, providing maximum durability by reducing the risk of damage during assembly and disassembly of the heating element 11, relative to the solution which is used as an output wiring.

So constructed heating element 11 having a suitable shape is placed in a socket 16 which provides an electrical connection between the heating element 11 located in the evaporator unit 2 and the power source 3. The connection provides an easy and quick installation of the heating element 11 in the electronic cigarette (it is of a so-called "quick release coupling" kind), which has a significant impact on the reduction in production costs. Reduction in production costs due to the short time of installation and fewer parts in the evaporator unit 2. Due to the fact that the points of supply 11*c* are fixed, there is no need for additional elements in the form of high temperature resistant wire shields or seals, which are to ensure galvanic isolation between the plus and minus of the heating element 11. The shape of the substrate 11*a* itself provides this separation of power.

An advantage of the heating element 11 according to the first embodiment of the present disclosure is to maximally simplify for the user of the electronic cigarette perform such tasks as cleaning, maintenance and replacement of the fluid transporting element nicotine. The fluid transporting element 12 of liquid nicotine is replaceable, the operation is very simple, and is reduced to pulling the heating element 11 out and to apply a new fluid transporting element 12 thereon, or possibly threading it through the holes into the base 11*a* of the heating element 11.

Figure 9:
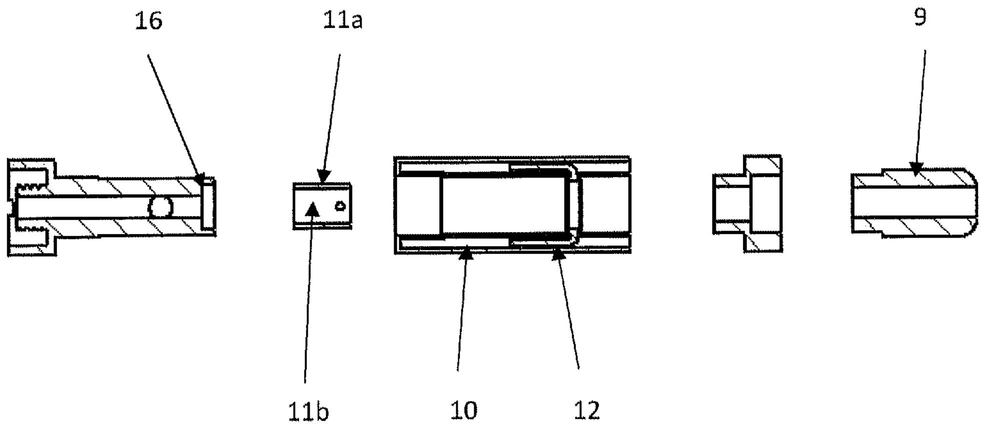
FIG. 9 shows an electronic cigarette in the exploded form of the second embodiment of the cylindrical heating element.

FIG. 9 shows an exploded view of the electronic cigarette according to a second embodiment. In this embodiment, the heating element is in the form of the tubular element, wherein a resistive layer 11*b* is deposited on the outer or inner side of the sleeve 11, or simultaneously on both sides. As in the first embodiment, the evaporator unit uses a capillary effect, which causes transfer of the nicotine liquid by the transporting element directly on the hot outer surface of the cylindrical heater thereby forming an aerosol.

The ends of the fluid transporting element 12 are located in a separate reservoir for nicotine liquid 10, where they have direct contact with the nicotine liquid. Part of the nicotine fluid transporting element 12 is outside the reservoir 10 in a direct contact with the outer surface of the heating element 11. The ends of the fluid transporting element 12 due to capillary effect transfer the nicotine liquid to the main part of the nicotine fluid transporting element 12, and thus the nicotine liquid comes into contact with the surface the heating element 11. After heating of the heating element 11 an aerosol will be generated.

By using a cylindrical heating element 11 and the fluid transporting element 12 with a circular cross section, the contact surface of these elements is significantly increased. As a result, a larger contact area will render the greater amount of aerosol due to the larger amount of fluid supplied to the heating area.

Furthermore, as in the first embodiment so constructed heating element 11 having a corresponding shape may be placed in a socket (not shown) which provides an electrical connection between the heating element 11 placed in the evaporator unit and the power supply 3. It is a kind of "quick release coupling." This coupling provides an easy and quick installation of the heating element 11 in the electronic cigarette, which has a significant impact on the reduction of production costs. Reduction of the production costs is due to the short assembly time and fewer elements in the evaporator unit 2. Due to the fact that the points of supply 11*c* are fixed, there is no need to use additional elements in the form of high temperature resistant cable covers or seals that are designed to provide galvanic isolation between plus and minus of the heating element 11. The shape of the substrate 11*a* itself provides this separation of power.

The construction of the electronic cigarette of the second embodiment also allows in some instances for easy replacement and maintenance of the heating element 11. When the fluid reservoir 10 is removable, it can be removed if necessary together with the fluid transporting element 12 mounted thereon to clean the heating element 11. The reservoir 10 with the fluid transporting element 12 are replaceable elements after all the nicotine liquid is smoked up.

In another embodiment, the disclosure relates to a method of aerosol generation in an electronic device. In the claimed method, evaporation of fluid is on the surface (heating surface) due to a specific heating element, which increases the efficiency of aerosol generation. The method comprises feeding a fluid through a fluid transporting element 12 to the heater 11, wherein the fluid is heated by a heating element 11 consisting of a dielectric substrate 11 with at least one resistive layer (11*b*) area applied thereon to a suitable temperature so as the fed fluid passes into gaseous state while in contact with its surface. One skilled in the art will appreciate that the temperature of the heating element necessary to heat the fluid to a suitable temperature, thereby to produce an aerosol from the fluid containing nicotine depends on several factors, including the contact surface of the fluid with the heating element, the rate of fluid delivery, and the materials from which the heating element components are made of. Depending upon the fluid type, one skilled in the art will know how to modify the parameters of the heating element and its power supply, so as to obtain a suitable temperature to allow the transition of the fluid into an aerosol form.

The present disclosure is not only limited to an electronic device generating an aerosol from the nicotine containing fluid. One skilled in the art will recognize that the disclosure also includes other electronic devices for generating an aerosol of fluid of any chemical composition that is compatible with materials used for the fluid transporting element 12 and in particular the materials used for the heating element 11.

In some embodiments the device may further comprise a protective layer arranged over the heater to help protect against physical or chemical damage. For example, in some implementations a glass layer may be provided over at least a part of the resistive layer comprising the heater 11*b*.

In some embodiments the device may further comprise a temperature sensor arranged to sense a temperature associated with the heater element 11, for example a temperature sensor may be mounted on a side of the dielectric substrate opposite to the side resistive layer 11*b*. Measurements from the temperature sensor may be used to control the supply of power to the heater to help maintain the heater element at a desired temperature, for example using conventional servo feedback techniques.

As already mentioned, the heater element may adopt any of a number of different shapes, for example, the heater element may or may not include holes through which to thread the fluid transporting element.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention (s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. An electronic device for generating an aerosol comprising a power unit and an evaporator unit, wherein the evaporator unit comprises a heating system with a heating element, wherein the heating element comprises a dielectric substrate with at least one resistive layer area applied thereon, wherein the substrate is made of ceramic and the at least one resistive layer area comprises lines of different widths.

2. The electronic device according to claim 1, wherein the substrate has a substantially cylindrical shape.

3. The electronic device according to claim 1, wherein the substrate is substantially flat.

4. The electronic device according to claim 1, wherein the substrate is substantially prism-shaped.

5. The electronic device according to claim 1, wherein the electronic device further comprises a fluid transporting element.

6. The electronic device according to claim 5, wherein the fluid transporting element is threaded through the heating element.

7. The electronic device according to claim 5, wherein the fluid transporting element surrounds the heating element.

8. The electronic device according to claim 5, wherein the fluid transporting element is only in contact with the substrate.

9. The electronic device according to claim 5, wherein the fluid transporting element comprises a string ceramic, mesh or cotton.

10. The electronic device according to claim 1, wherein the resistive layer area is applied on the dielectric substrate using a thick film technique.

11. The electronic device according to claim 1, wherein the resistive layer area is continuous.

12. The electronic device according to claim 1, wherein the resistive layer area comprises separate resistive layer areas on one substrate to form separate heaters.

13. The electronic device according to claim 1, wherein the resistive layer area is applied both on an internal and an external side of the substrate.

14. The electronic device according to claim 1, wherein the resistive layer area comprises power points on the dielectric substrate for connecting the heating element to a power supply.

15. The electronic device according to claim 1, further comprising a socket and the heating element is placed in the socket to connect the heating element to a power supply.

16. The electronic device according to claim 1, wherein the heating element is substantially tubular.

17. The electronic device according to claim 1, further comprising a protective layer arranged over the heating element.

18. The electronic device according to claim 1, further comprising a temperature sensor, wherein the electronic device is configured to control a supply of power to the heating element to maintain the heating element at a desired temperature.

19. An evaporator unit for an electronic device for generating an aerosol, wherein the evaporator unit comprises a heating element and a fluid transporting element, wherein the heating element comprises a dielectric substrate with at least one resistive layer area applied thereon, wherein the substrate is made of ceramic and the at least one resistive layer area comprises lines of different widths.

* * * * *